(12) United States Patent
Martin

(10) Patent No.: US 6,669,372 B1
(45) Date of Patent: Dec. 30, 2003

(54) TURBOCHARGER THRUST BEARING

(75) Inventor: Steven P. Martin, Walnut, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/208,973

(22) Filed: Jul. 30, 2002

(51) Int. Cl.$^7$ ................................ F16C 17/04
(52) U.S. Cl. .................. 384/303; 29/898.041
(58) Field of Search .................. 384/303, 305, 384/306, 307, 308, 122; 29/898.041

(56) References Cited

U.S. PATENT DOCUMENTS

| | | | |
|---|---|---|---|
| 4,557,664 A | 12/1985 | Tuttle et al. | |
| 4,714,356 A | 12/1987 | Damour et al. | |
| 5,178,471 A | 1/1993 | Roessler et al. | |
| 6,045,266 A | 4/2000 | Mitsubori et al. | |
| 6,126,414 A | 10/2000 | Koike | |
| 6,149,310 A | 11/2000 | Ono et al. | |
| 6,371,651 B1 | 4/2002 | Fujii et al. | |

*Primary Examiner*—Lenard A Footland
(74) *Attorney, Agent, or Firm*—Ephraim Starr

(57) ABSTRACT

A double sided 360° thrust bearing having oppositely oriented interlocking elements each with an open segment and an elevated segment is assembled over a thrust collar on the shaft interconnecting the turbine wheel and compressor wheel of a turbocharger. Bearing pads on the front surface and rear surface of the mated interlocking elements and on the oppositely oriented elevated segments engage reaction surfaces in a channel on the thrust collar. Lubrication channels in the mating faces of the interlocking elements provide oil to the bearing pads on the front and rear surfaces of the bearing while interconnecting lubrication conduits provide oil to the bearing pads on the elevated segments.

12 Claims, 4 Drawing Sheets

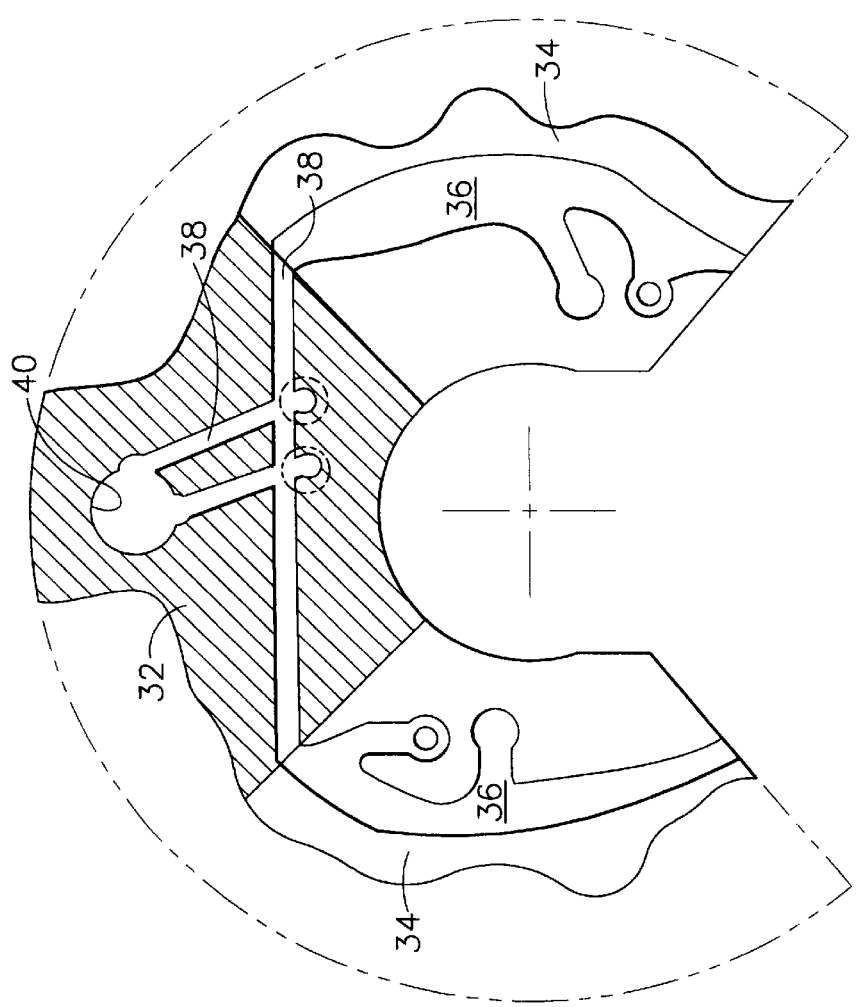
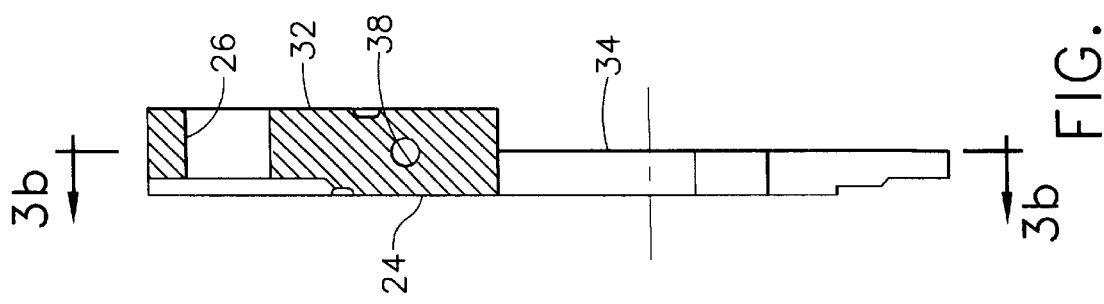
FIG. 3b
FIG. 3a

TURBOCHARGER THRUST BEARING

BACKGROUND OF THE INVENTION

1. Field of the Invention

This invention relates generally to the field of thrust bearings for turbocharger rotor groups and, more particularly, to a double sided 360° thrust bearing having separable elements with a plurality of bearing pads on a first side and one elevated segment with at least one bearing pad on the opposite side interlinking with an open segment on the opposite element to form a complete double sided bearing.

2. Description of the Related Art

Turbochargers which have higher thrust loads, such as those for large diesel engine applications, typically employ a dedicated thrust bearing to react the thrust forces. For ease of assembly, typical bearings are horseshoe shaped to be received over the rotor shaft of the turbocharger to engage a thrust collar mounted on the shaft. The thrust collar has a circular channel which receives the thrust bearing and provides the reaction surface for the bearing pads machined in the surface of the thrust bearing. In many cases, the thrust bearing is double sided, having bearing pads on each side to accommodate thrust loads in either direction along the rotor shaft. In most cases, oil is supplied through lubricating oil channels to lubrication wells in each pad of the bearing. The bearing is mounted to lands cast or machined within the center housing of the turbocharger using bolts or other conventional fasteners and the lubricating oil channels in the bearing engage oil supply sources in the center housing.

As turbocharger rotational speed and loads increase, the horseshoe bearing configuration may not provide sufficient thrust bearing capacity or unsymmetrical loads may be created due to the open portion of the bearing. 360° bearings, however, may impose unacceptable assembly constraints in manufacturing the turbocharger if the shaft must be inserted through the bearing. It is, therefore, desirable to have a bearing which can be assembled over the shaft of the turbocharger while providing 360° load carrying capability.

SUMMARY OF THE INVENTION

The inventive bearing comprises a 360° double sided thrust bearing having a central shaft bore and formed from two oppositely oriented interlocking elements each having an open segment subtending a mating angle, a first side with a plurality of bearing pads and a second side with an elevated segment having at least one bearing pad, the elevated segment opposite the open segment and subtending the mating angle to be received within the open segment of the other interlocking element.

The bearing elements are assembled around the shaft interconnecting the turbine and compressor impellers of the turbocharger and received within the channel of a thrust collar mounted on or machined into the shaft, the channel walls engaging the bearing pads to react thrust forces along the shaft in either direction. Lubrication for the pads is provided by oil channels formed in the mating faces of the two elements with interconnecting orifices into the lubrication well at each pad. Oil channels for the pads in the elevated segment interconnect with the oil channels in the mating surfaces or alternatively comprise conduits from the shaft bore or dedicated inlet orifices on the bearing periphery.

BRIEF DESCRIPTION OF THE DRAWINGS

These and other features and advantages of the present invention will be better understood by reference to the following detailed description when considered in connection with the accompanying drawings wherein:

FIG. 3a is a sectional view along line 3a—3a in FIG. 1;

FIG. 3b is a partial inner surface view of one of the mating elements showing the oil flow channels for one embodiment;

DETAILED DESCRIPTION OF THE INVENTION

Figure 1:
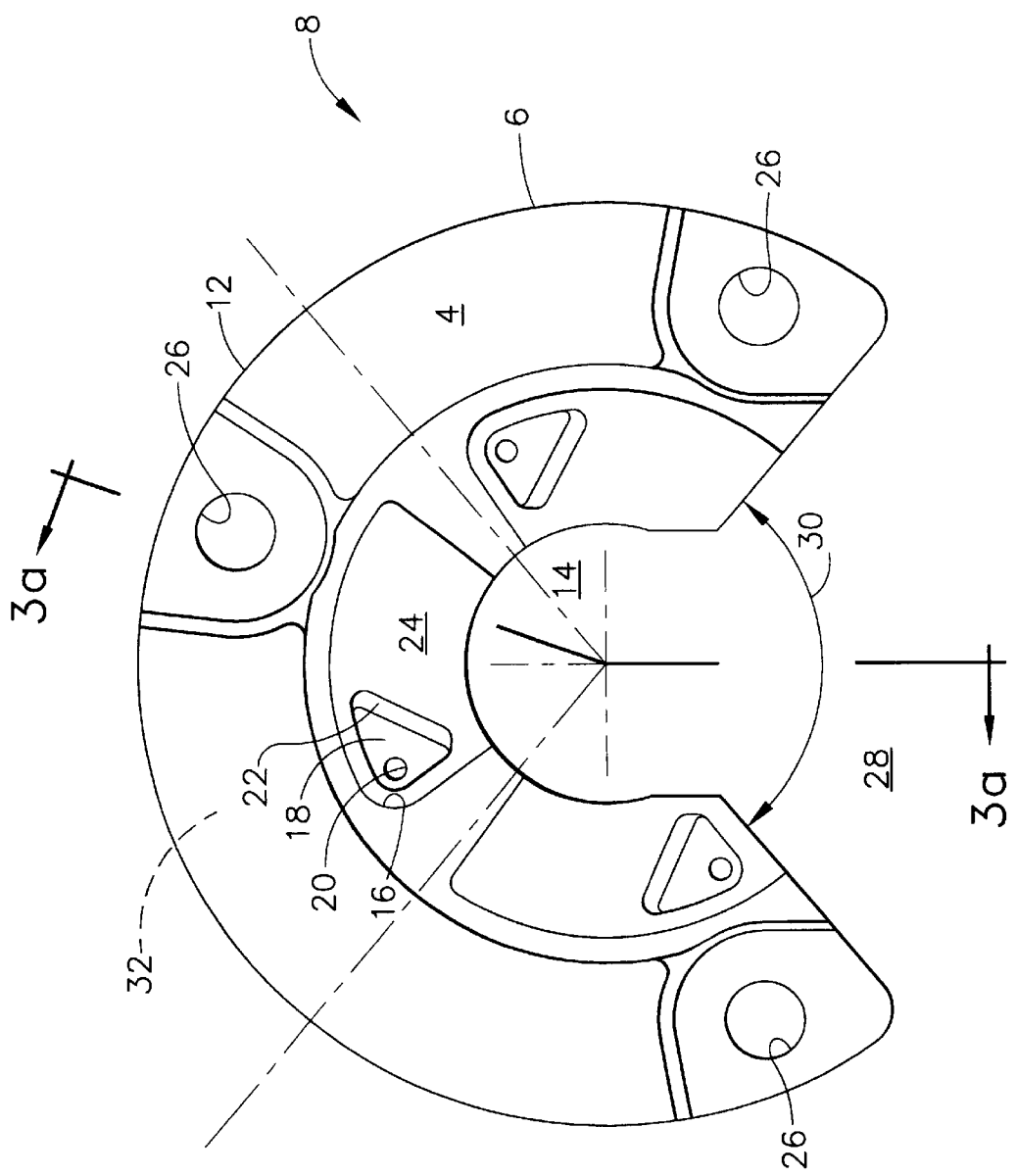
FIG. 1 is a front view of one un-mated element of the bearing showing the open segment.

Referring to the drawings, FIG. 1 shows the front face 4 of the first element 6 of the double sided 360° thrust bearing 8. Each element, in the embodiment shown in the drawings, has a substantially circular periphery 12. The mated elements have a central bore 14 through which the shaft of the turbocharger extends. Bearing pads on the front face, generally designated 16, include a lubricating well 18 with an orifice 20. Each well has a ramp 22 for oil dispersal onto the running surface 24.

Figure 2:
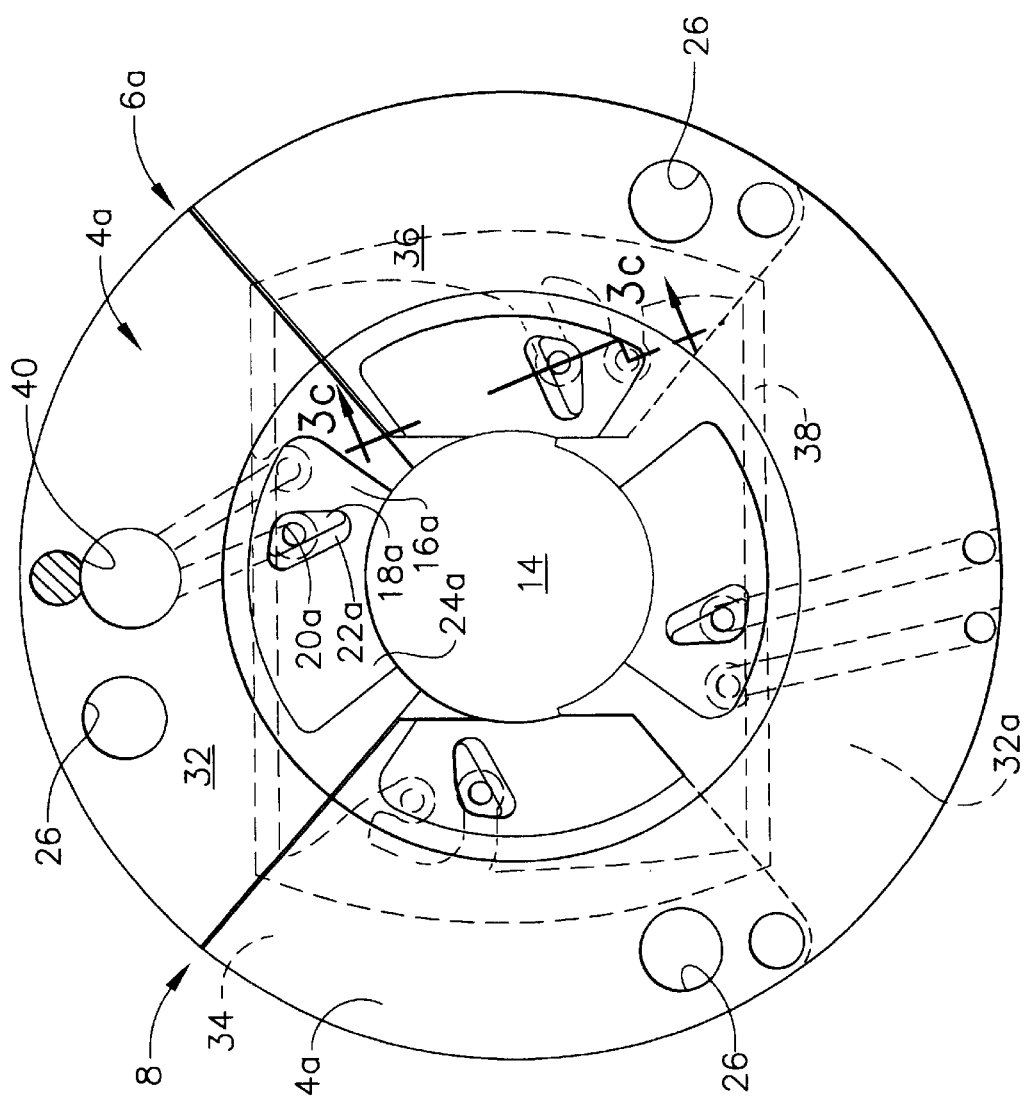
FIG. 2 is a rear view of the bearing showing the mated elements.

For the embodiment shown in the drawings, the bearing pads are asymmetrical for the front and rear surfaces of the thrust bearing. FIG. 2 shows the bearing pads 16a, lubricating wells 18a, orifices 20a, ramps 22a and running surfaces 24a for the pads on the rear face 4a on the second element 6a of the bearing. The relationship to the front bearing pads is shown in phantom in FIG. 2. In alternative embodiments, symmetrical bearing pads are employed on both faces for cost reduction and common tooling. The elements of the bearing having mounting holes 26 for attachment of the bearing to the center housing of the turbocharger, as will be explained in greater detail subsequently.

Each element of the bearing has an open segment 28 as seen in FIG. 1. In the embodiment in the drawings, the open segment is arcuate and subtends an angle generally designated 30 extending from and contiguous with the aperture forming the central bore. The mating element has an elevated portion 32a, as seen in FIG. 2 which is received in the open segment to form the complete 360° bearing surface. For the embodiment shown, the elevated portion of the mating segment provides one of the four pads on each side of the bearing. In alternative embodiments for greater loads or rotational speed, a larger number of pads are machined on each side of the bearing and the elevated portion includes multiple bearing pads.

Figure 3C:
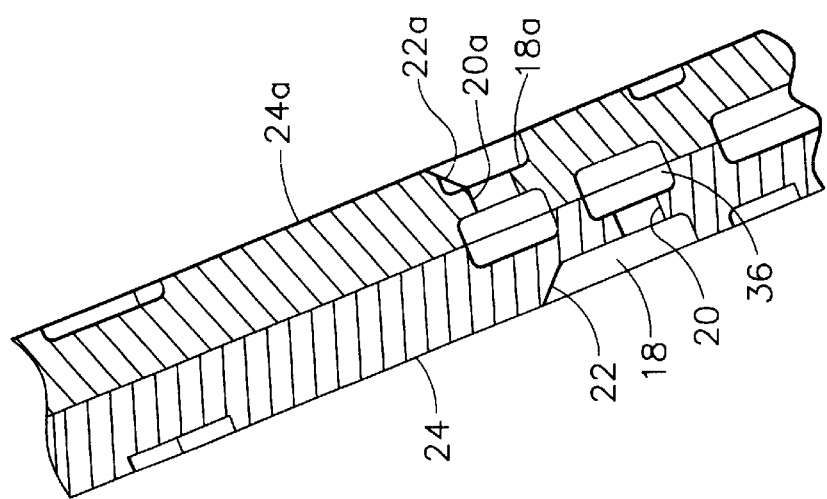
FIG. 3c is a sectional view along line 3c—3c showing the mated elements of the bearing with exemplary lubrication wells for one pad on each side of the bearing and the associated oil flow channels.

In the quadrants of each element not contained in the elevated portion or open segment, each element is substantially half the thickness of the bearing. FIGS. 3a, 3b and 3c illustrate this and various other features of the elements in section views. FIG. 3a shows the elevated portion of the first element shown in FIG. 1 in the upper portion of the drawing and the open segment and center bore in the lower portion. FIG. 3b shows one embodiment for lubrication of the bearing pads. The inner faces of the half thickness quadrants 34 are seen with the lubrication channels 36 machined into the surface to form conduits when mated with the opposing element. The machined half conduits terminate at the open segment and elevated segment faces, where they engage drilled conduits 38 in the elevated portions which supply lubricating oil to the bearing pads in those portions as seen in FIG. 3b where the elevated segment 32 is shown in section. These conduits are formed in the embodiment shown with through drilled holes, blind sealed with ball inserts. Oil inlet 40 abuts a lubricating oil source in the center housing mounting to supply the bearing lubricant. Lubricant is alternatively routed from the oil source through the channels in the bearing to the shaft to use the rotation of the shaft for lubricant distribution into conduits or grooves feeding the wells at the bearing pads.

FIG. 3c shows the lubricating wells and oil feed orifices as well as the oil conduits formed by the channels for both elements of the bearing when mated.

Figure 4:
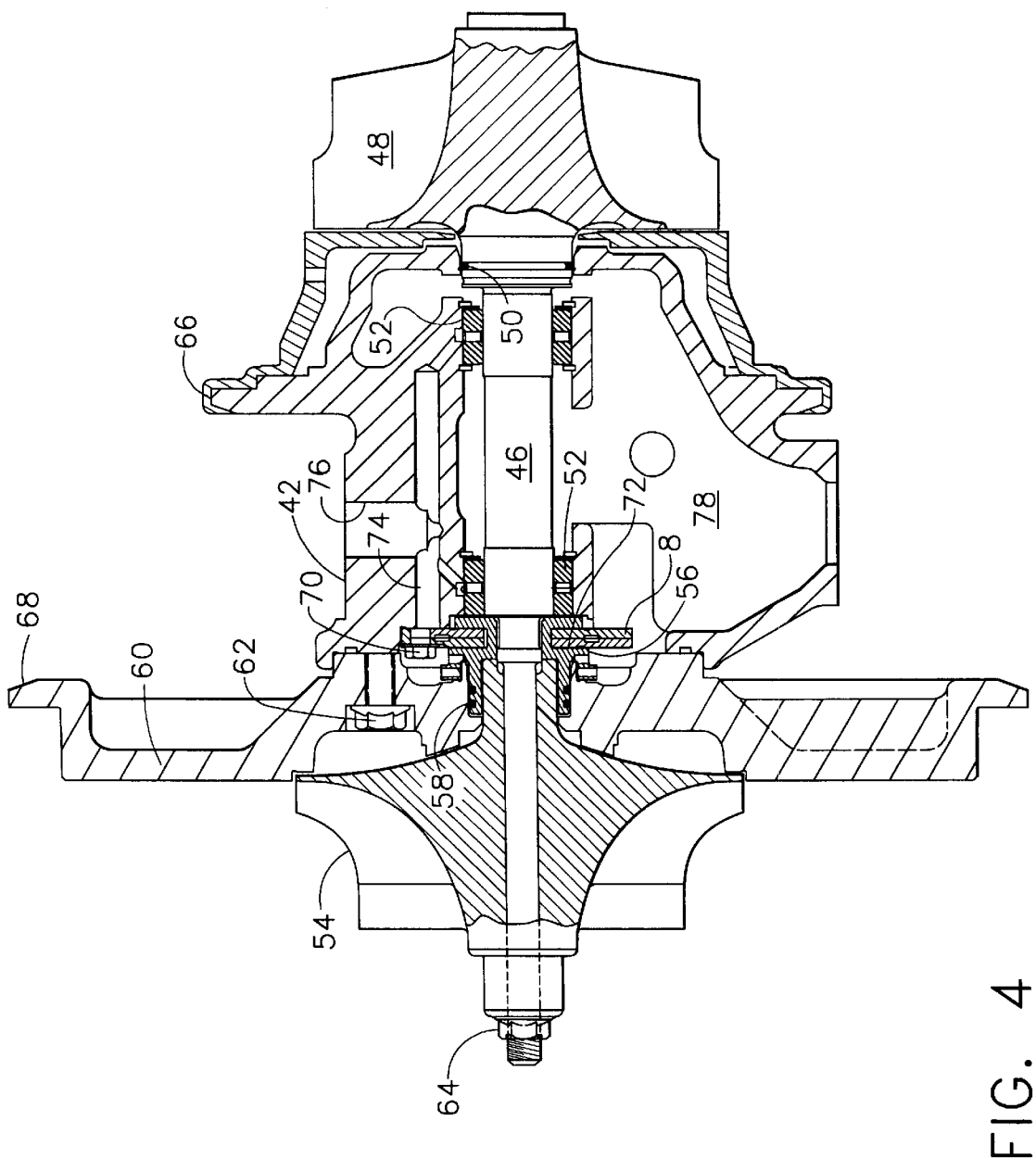
FIG. 4 is a sectional elevation view of a turbocharger center section and rotating assembly in which a bearing embodying the present invention is mounted.

The bearing as assembled in a turbocharger application is shown in FIG. 4. The turbocharger center housing 42 supports journal bearing assemblies which receive the rotor shaft 46. The turbine wheel 48 is attached to a first end of the shaft and a piston ring 50 seals the center housing. Journal bearings 52 support the shaft. The shaft extends through the compressor wheel 54, in the embodiment shown. A thrust collar 56 is received over the shaft and carries seal rings 58 for sealing the compressor housing backplate 60 which is attached to the center housing with bolts 62. The compressor wheel is secured to the shaft with a nut 64 which secures the entire rotor. The turbine housing and compressor housing, which attach to flanges 66 on the center housing and 68 on the backplate respectively, have been eliminated for clarity.

The thrust bearing is attached to the center housing with bolts 70 received through the mounting holes 26 as previously described. In alternative embodiments, the thrust bearing is secured to the center housing with a retaining ring or clamped between backplate and center housing on lands cast or machined into the backplate. The thrust bearing is engaged by the channel 72 of the thrust collar to react the thrust forces in either direction along the shaft which may be generated by the compressor or turbine. While a separate thrust collar element is shown in the embodiments in the drawings, machined surfaces on the shaft and/or compressor wheel hub are used as the reaction surfaces for the bearing in alternative embodiments. For the embodiment shown in the drawings, lubrication for the thrust bearing and journal bearings is supplied through conduit 74 which is fed through the oil inlet 76. Oil is scavenged through gallery 78 in the center housing. Alternatively, channels in the front or rear surfaces of the interlocking elements, with appropriate conduits to the oil conduits within the mated bearing, engage the channel walls of the thrust bearing to provide a gallery for lubrication oil retention and distribution.

The architecture of the bearing with the elevated and open segments, allows the bearing to be assembled around the thrust collar, thereby allowing a one piece collar. Assembly of substantially the entire rotor except the compressor wheel may be accomplished prior to installing the backplate. The compressor wheel is then fitted over the shaft and secured with the nut to secure the rotor.

While the open and elevated segments of the mating elements are shown in the embodiments of the drawings as arcuate in shape and arranged vertically, alternative embodiments employing an open channel and mating elevated geometry having a width at least equal to the diameter of the center bore are also contemplated by the invention. The elevated and open mating elements are arranged horizontally in alternative embodiments.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A 360 degree double sided thrust bearing comprising two oppositely oriented interlocking elements each having an open segment extending from a central aperture, a first side with a plurality of bearing pads and a second side with an elevated segment having at least one bearing pad, the elevated segment opposite the open segment to be received within the open segment of the other interlocking element, the central apertures of the mated elements defining a shaft bore.

2. A thrust bearing as defined in claim 1 wherein the open segment is arcuate subtending a mating angle and the elevated segment subtends the mating angle to be received within the open segment of the other interlocking element.

3. A thrust bearing as defined in claim 1 wherein each interlocking element has a mating face intermediate the open segment and the elevated segment, the mating face including at least one lubricating oil channel connected to at least one bearing pad.

4. A thrust bearing as defined in claim 3 wherein the elevated segment includes at least one lubrication conduit connected to the at least one lubricating oil channel and the at least one bearing pad in the elevated segment.

5. A thrust bearing assembly for a turbocharger having a turbine wheel and compressor wheel interconnected by a shaft supported by a bearing in a center housing, the thrust bearing comprising:

a first interlocking element having a first open segment extending from a first central aperture, a front surface with a plurality of bearing pads and a first mating surface with a first elevated segment having at least one bearing pad, the first elevated segment opposite the first open segment;

a second interlocking element having a second open segment extending from a second central aperture, a rear surface with a plurality of bearing pads and a second mating surface, the second elevated segment having at least one bearing pad, the second elevated segment opposite the second open segment, the second interlocking element oppositely oriented to the first interlocking element with the first open segment receiving the second elevated segment and the first elevated segment being received within the second open segment, the first and second central apertures of the mated interlocking elements forming a central bore;

a thrust collar received over the shaft and within the central bore, the collar having a channel engaging the bearing pads on the front and rear surfaces and first and second elevated segments of the mated first and second interlocking elements; and, means for attaching the mated interlocking elements to the center housing.

6. A thrust bearing assembly for a turbocharger as defined in claim 5 wherein the first interlocking element has a first mating face intermediate the first open segment and the first elevated segment, the first mating face including at least one first lubricating oil channel connected to at least one bearing pad on the front surface;

the second interlocking element has a second mating face intermediate the second open segment and the second elevated segment, the second mating face including at least one second lubricating oil channel symmetrically oriented with the at least one first lubricating oil channel to form an oil gallery with the first interlocking element and second interlocking element operably engaged; and further comprising:

means for supplying lubricating oil to the first lubricating oil channel.

7. A thrust bearing as defined in claim 6 wherein said at least one second lubricating oil channel is connected to at least one bearing pad on the rear surface.

8. A thrust bearing as defined in claim 7 wherein the first elevated segment includes at least one first lubrication conduit connected to the at least one first lubricating oil channel and the at least one bearing pad in the first elevated segment and the second elevated segment includes at least one second lubrication conduit connected to the at least one second lubricating oil channel and the at least one bearing pad in the second elevated segment.

9. A thrust bearing assembly as defined in claim 5 wherein the first and second open segments are arcuate subtending a mating angle and the first and second elevated segments subtend the mating angle to be received within the second and first open segments, respectively.

10. A method for assembly of a thrust bearing for a turbocharger having a turbine wheel and compressor wheel interconnected by a shaft supported by a bearing in a center housing, comprising the steps of:

supplying a thrust collar having a channel;

assembling over the collar a first interlocking element having a first open segment extending from a first central aperture, a front surface with a plurality of bearing pads operably engaging a first side of the collar channel and a first mating surface with a first elevated segment having at least one bearing pad, the first elevated segment opposite the first open segment;

assembling over the collar opposite the first interlocking element, a second interlocking element having a second open segment extending from a second central aperture, a rear surface with a plurality of bearing pads operably engaging a second side of the collar channel and a second mating surface, the first elevated segment having at least one bearing pad, the second elevated segment opposite the second open segment, with the first open segment receiving the second elevated segment and the first elevated segment being received within the second open segment, the first and second mating surfaces being in contact and the first and second central apertures of the mated interlocking elements forming a central bore concentric with the collar, the first and second sides of the collar channel also operably engaging the bearing pads on first and second elevated segments of the mated first and second interlocking elements; and, attaching the mated interlocking elements to the center housing.

11. A method for assembling a thrust bearing as defined in claim 10 additionally comprising the preliminary steps of:

attaching the turbine wheel to the shaft; and inserting the shaft through the bearing in the center housing; and wherein the step of supplying the thrust collar comprises inserting the shaft through a thrust collar.

12. A method for assembling a thrust bearing as defined in claim 11 additionally comprising the subsequent steps of:

inserting the shaft through a compressor backplate;

securing the backplate to the center housing;

inserting the shaft through the compressor wheel; and, securing the compressor wheel to the shaft.

\* \* \* \* \*